United States Patent [19]

Shimada

[11] Patent Number: 4,888,707
[45] Date of Patent: Dec. 19, 1989

[54] OBJECT COLLISION DETECTION METHOD AND APPARATUS

[75] Inventor: Kenji Shimada, Kawasaki, Japan

[73] Assignee: International Business Machines Corporation, Armonk, N.Y.

[21] Appl. No.: 233,686

[22] Filed: Aug. 18, 1988

[30] Foreign Application Priority Data

Sep. 9, 1987 [JP] Japan .................................. 62-224232

[51] Int. Cl.$^4$ ............................................... B25J 9/00
[52] U.S. Cl. .................................. 364/513; 364/474.2; 364/461
[58] Field of Search ................ 364/474.2, 167.01, 513, 364/461

[56] References Cited
U.S. PATENT DOCUMENTS
4,578,757 3/1986 Stark .................................. 364/513

Primary Examiner—Allen MacDonald
Attorney, Agent, or Firm—George E. Clark

[57] ABSTRACT

A collision detection system with less computation time and higher performance is provided. The shortest distance between the surface of one object and the surface of another at the beginning or end of a period to be checked is compared with the sum of the maximum length of paths along which points of the surface of the one object move in the period, and the like of the other. If the former is bigger than the later, then it is sure that the two objects cannot collide in the period. If not, it is not sure, and the period is divided into two parts, and then such a test is done for each partial period. Such a test and division are recursively performed until the whole period is ensured to have no collision or an approximate collision is detected. The approximate collision is defined as a state of the shortest distance between the surface of the one object and the surface of the other being less than a predetermined threshold. This invention is useful in CAD/CAM system in particular for off-line robot movement teaching.

20 Claims, 7 Drawing Sheets

OBJECT COLLISION DETECTION METHOD AND APPARATUS

BACKGROUND OF THE INVENTION

1. Field of the Invention

This invention relates to an object collision detection apparatus that determines in advance, using computer simulation techniques, whether two objects will collide, or detects likewise the location and the time of collision, and more particularly to one that is designed to attain sufficient accuracy even at a high speed.

The invention can be applied to control of a robot, a Numerical Control (NC) machine, and other applications.

In the following, the term "collision" means that a moving object hits another object, while the term "interference" means a state in which two objects overlap each other.

2. Prior Art

In a planning stage of production, it is recognized that geometric simulation using shape models is effective in verifying the motions of a robot or working process of an NC machine. In such simulation, it is important to detect collision between objects. For example, in the so-called off-line robot motion teaching, in which the motion is taught to the robot without stopping the production line, it is essential to check collision between a robot and another robot or object in advance, by simulation.

Conventional techniques for detecting collision can be roughly divided into the following three types.

SAMPLING METHOD

This technique determines the positions and orientations of moving objects at sufficiently short time intervals, delta t, and solves a problem of statistical interference at each sampling time. Refer to "A Method for Checking Interference at High Speed in Off-line Robot Teaching" (in Japanese), Ozawa et al., Journal of Robotics Society, Vol. 4, No. 4, pp. 5-13, April 1986, for details.

The sampling technique is widely employed because it is easy to implement. However, if the time interval delta t for sampling is too large, there is a possibility of overlooking collision. On the other hand, if delta t is too short, the amount of calculation required increases.

ENVELOPE GENERATION METHOD

This technique generates volumes swept by moving objects and considers them as solid bodies, and then investigates interference between the solid bodies. In this envelope generation technique, it is still difficult to generate the envelope. In addition, although the occurrence of the collision can be detected, there remains a problem that the time and status, when and where the collision occurs cannot be obtained.

INTERSECTION CALCULATION METHOD

This technique mathematically expresses the trajectories of surfaces, edges and vertices of moving objects as a function of time, and solves equations between them to find intersection points. Refer to "Interference Detection Among Solids and Surfaces: by J. W. Boyse, Communication of the ACM, Vol. 22, No. 1, pp. 3-9, 1979, for details of this technique.

In the intersection calculation method, equations can be analytically solved in case of pure rotation or translation. However, in cases where trajectories of general motions are expressed using three orders of functions of time, the equations become of sixth or ninth order of time. The amount of calculation increases because convergence calculation is needed to solve them.

In any case, a tremendous amount of calculation is a problem that is always pointed out in determining collision between moving objects by using a three-dimensional geometric model. The causes of this are considered complexities of the shape and trajectories of objects.

The complexity of the shape has been in the past considered. The simplest method of reducing the amount of calculation is rough check by using a rough shape containing the exact shape such as an envelope sphere, an envelope rectangular parallelepiped or a envelope cylinder. This utilizes a condition in which collision does not occur; "Collision does not occur if envelope shapes do not collide," which is the contraposition of a necessary condition in which collision occurs; "Envelope shapes collide with each other if collision occurs."

The effectiveness of this approach is well known.

However, suppressing increase of the amount of calculation from another aspect of the complexity of trajectories has not been considered in the methods proposed. Thus, the invention provides a technique for suppressing the increase in the amount of calculation by considering trajectories.

Published Unexamined Japanese Patent Applications Ser. No. 58-22690 and Ser. No. 60-99591 are related to the present invention. Both employ the sampling method, and do not consider trajectories like the present invention.

SUMMARY OF THE INVENTION

An object of the present invention is to provide an object collision detection apparatus that can detect collision with no overlooking and reduced amount of calculation, and that can also detect the time and location of collision.

According to the present invention, the principle is considered that two objects do not collide if the condition that the minimum distance between two objects at the start or the end of movement is larger than the sum of the "maximum movement lengths" of the two objects is satisfied. Further, if the condition is not satisfied, the trajectory is divided, and shorter trajectories obtained through the division are again checked for the above condition. Such a procedure is recursively executed to detect any collision without fail. In a case where the minimum distance between the two objects becomes less than a predetermined threshold, and they are approximated to collide with each other, the processing is discontinued, so that the recursive procedure is not executed infinitely.

The "maximum movement length" means the longest of the lengths of paths on which points on the surface of an object move respectively.

DESCRIPTION OF A PREFERRED EMBODIMENT OF THE INVENTION

Now, one embodiment of the invention is described by referring to the drawings.

Overview of the System

Figure 1:
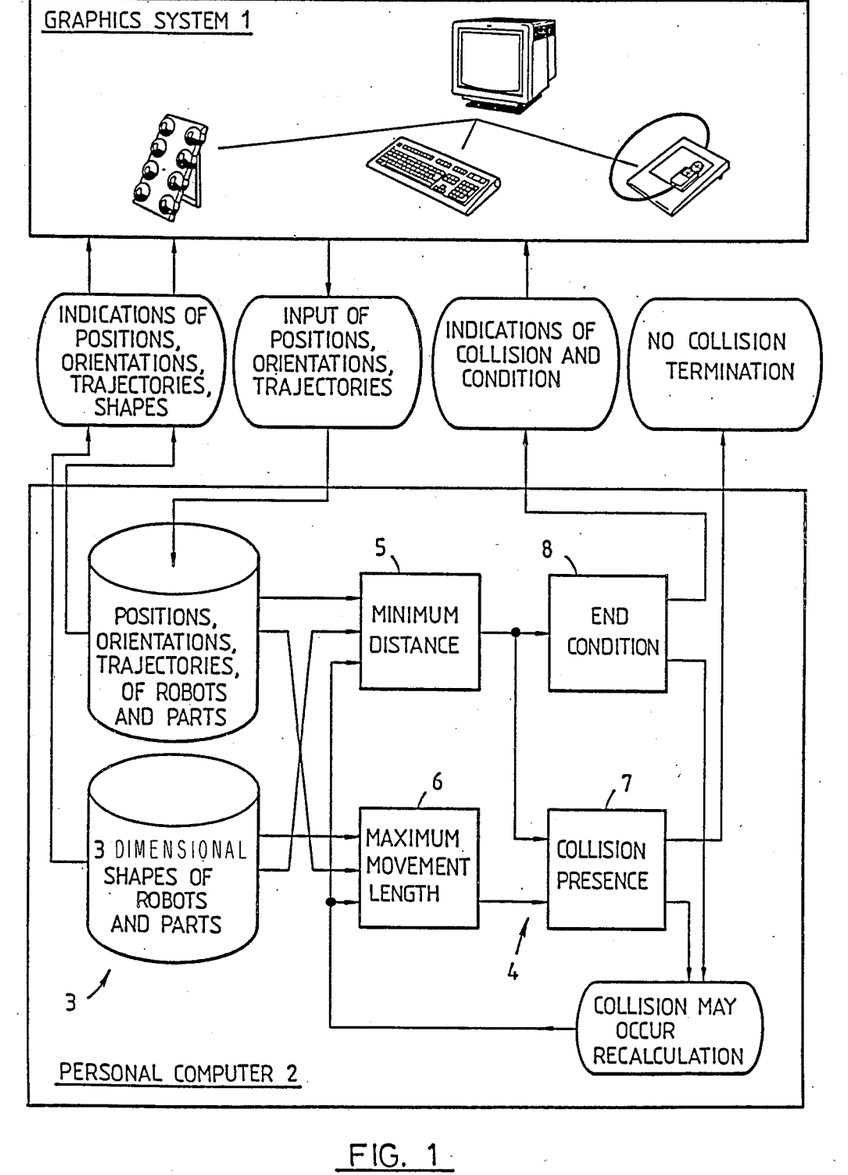
FIG. 1 shows a system configuration of a preferred embodiment of the present invention.

FIG. 1 shows a system configuration employed by an embodiment of the invention. In the figure, the system consists of an IBM 5080 graphic system 1 and an IBM RT-PC personal computer 2. The personal computer 2 constitutes a data base 3 and collision detector section 4, which is implemented in software. In the figure, various functions are represented by blocks to help understand the configuration of the collision detector section 4. Of course, it is possible to realize each block with hardware.

Figure 3:
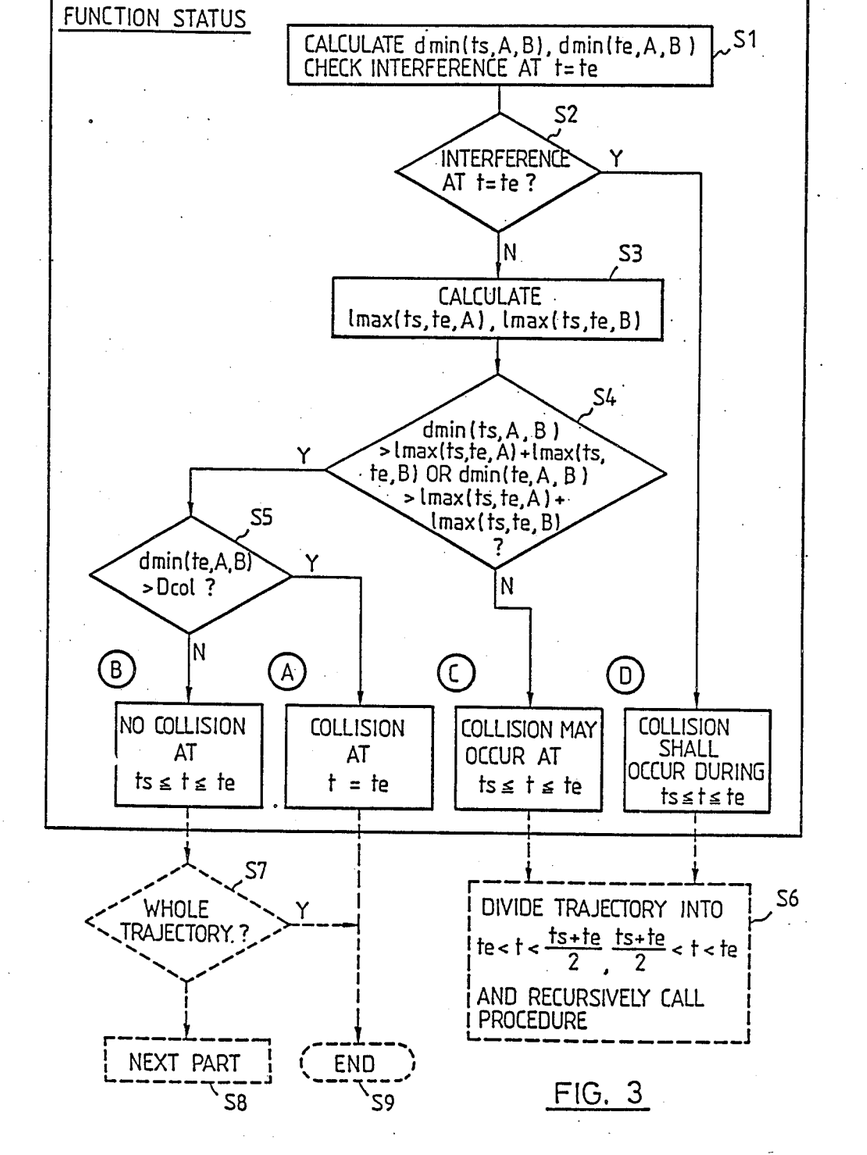
FIG. 3 shows a flowchart illustrating an algorithm employed in the embodiment of FIG. 1.

A minimum distance calculating section 5, a maximum movement length calculating section 6, a collision presence determining section 7, and an end condition determining section 8 correspond to steps S1, S3, S4 and S2 in FIG. 3, respectively. The description of the operations in the system is not here repeated because it is fully clear from the above description.

Effect of the Invention

According to the present invention, a technique is provided wherein collision between moving objects is detected without overlooking by recursively repeating judgment of the condition determining collision and division of a trajectory into two parts.

According to the present invention, the complexity of a trajectory is considered, which is a cause of increasing the amount of calculation along with the complexity of a shape, but has not given attention to in the past, and consequently a collision can be efficiently detected. The present invention is superior to the sampling method in regard with the following points:

- The amount of the calculation corresponds to the required "accuracy of solution," and there is no overlooking even if the accuracy is arranged rough.
- The amount of the calculation corresponds to the "possibility of collision," and no unnecessary calculations are performed.

In a case where great accuracy is not required, the shape of an object may be approximated as a set of multiple spheres. This enables the calculation of minimum distance and the maximum movement length with a very small amount of calculation.

Conditions of Judgment on Collision

First, a necessary condition for causing collision between moving objects is described, and then a condition in which collision will not occur is derived based on that condition.

Figure 2:
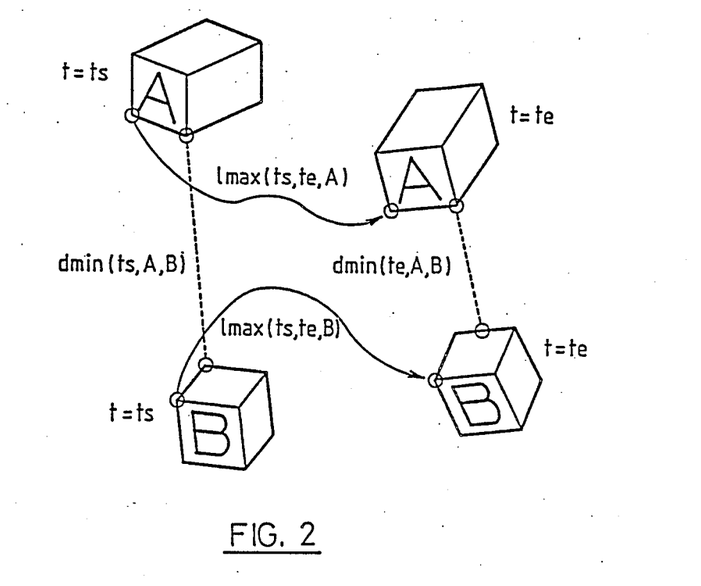
FIG. 2 shows a diagram illustrating a principle of the present invention.

As shown in FIG. 2, objects A and B move at time $ts <= t <= te$, and notations are as follows:

dmin(ts,A,B) : Minimum distance between objects at time ts dmin(te,A,B) : Minimum distance between objects at time te lmax(ts,te,A): Maximum movement length of object A during $ts <= t <= te$ lmax(ts,te,B): Maximum movement length of object B during $ts <= t <= te$ where the "maximum movement length" means, as described in the above, the longest of lengths of paths on which points on the surface of an object move.

When objects A and B collide at time $ts <= t <= te$, the following two conditions are always established:

Condition P $$dmin(ts,A,B) <= lmax(ts,te,A) + lmax(ts,te,B)$$

"The sum of the maximum movement lengths of the objects A and B in the time interval of $ts <= t <= te$ is larger than the minimum distance at the movement start time ts."

Condition Q $$dmin(te,A,B) <= lmax(ts,te,A) + lmax(ts,te,B)$$

"The sum of the maximum movement length of objects A and B in the time interval of $ts <= t <= te$ is larger than the minimum distance at the movement end time te."

That is, (Collision occurs) —> (P Q)

(P Q) is a necessary condition to cause collision. By taking contraposition of this proposition, a sufficient condition in which collision will not occur is derived.

$$\overline{(P\ Q)} \rightarrow \overline{(Collision\ occurs)}$$
$$\overline{(P\ Q)} \rightarrow (Collision\ does\ not\ occur)$$

Namely, the following judging condition is obtained.

Determining Condition of Collision

If dmin(ts,A,B) > lmax(ts,te,A) + lmax(ts,te,B) or dmin(te,A,B) > lmax(ts,te,A) + lmax(ts,te,B) is established, collision will not occur at $ts <= t <= te$.

Collision Detecting Algorithm

Here, collision is defined as a state in which two objects approach each other within a sufficiently short distance Dcol.

The most important points of the collision detecting algorithm of the present invention are to judge the determining condition derived in E1, and to recursively divide the trajectory into two parts.

Now, a case where two moving objects A and B move independently at time $ts <= t <= te$ in a three dimensional space, changing their orientations, will be studied. First, a function STATUS (ts, te) is defined for any time $ts <= t <= te$ for investigating a status on collision according to the flowchart of FIG. 3. The function returned one of four statuses of FIG. 4 as a result value.

Figure 4:
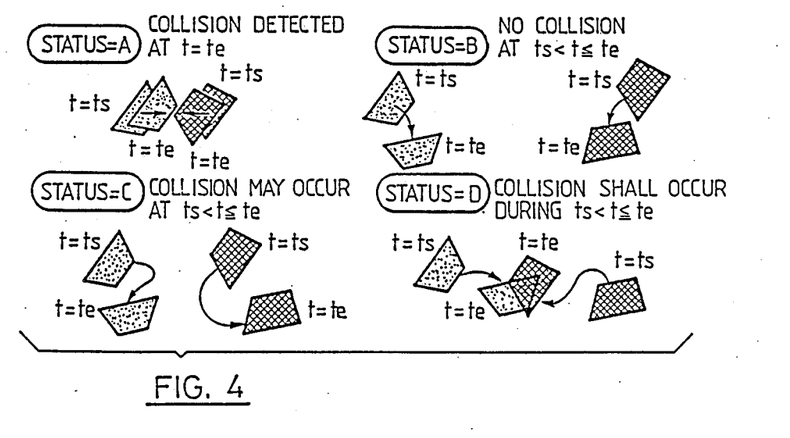
FIGS. 4, 5 and, 6A through 6E show diagrams illustrating the flowchart of FIG. 3.

Status A: Collision is detected at t=te.
Status B: Collision cannot occur at $ts <= t <= te$.

Status C: Collision is possible at ts<=t<=te.
Status D: Collision shall occur at ts<=t<=te.

Namely, as shown in FIG. 3, dmin(ts,A,B) and dmin(te,A,B) are calculated, while interference between objects A and B at time t=te is checked (S1). This checking may be secondarily performed in finding dmin(te,A,B) from shape data or position data of objects A and B. Then, if it is recognized in the step S2 that there is interference at t=te, STATUS=D is outputted. If it is not recognized that there is interference, the checking goes to the step S3. In the step S3, 1max(ts,te,A) and 1max(ts,te,B) are calculated, and then judgment is made on whether the above-mentioned determining condition on collision is established (S4). If the determining condition is not established, STATUS=C is outputted. If the determining condition is established, existence of non-existence of approximate collision is judged in the step S5. If there is no approximate collision, STATUS=B is outputted. If there is approximate collision, STATUS=A is outputted.

In a case where STATUS=C or D is outputted, the trajectory is divided into two parts in the step 6, and a procedure COLLISION is recursively invoked for each trajectory part. In a case where STATUS=B is outputted, whether or not there is a remaining trajectory part, is judged in the step S7. If there is, the procedure COLLISION is invoked for the next part in the step S8. If there is no remaining trajectory part, the processing terminates. It also terminates if STATUS=A is outputted (S9).

When function STATUS(ts,te) is used, it is possible to find existence of collision at Ts<=t<=Te, and the time when the collision occurs by invoking the procedure COLLISION(ts,te) with ts=Ts and te=TE. The following procedure COLLISION(Ts,te) is written in a PASCAL like language.
procedure (COLLISION(ts,te):
begin
ST<−STATUS(ts,te):
if ST=A then return(collision at tcol=te)
else
if ST=B then return(no collision)
else
/* in case of C or D, recursive calling */
if COLLISION(ts,(ts+te)/2) =collision at tcol
then return (collision at tcol)
else return(COLLISION((ts+te)/2,te));
end In a case where the result of STATUS(ts,te) is status C or D, there remains a possibility that collision will occur at time ts<=t<=te, so that the time interval is divided into two parts, ts<=t<=(ts+te)/2 and (ts+te)/2<=t<=te, each of which time interval is recursively investigated. The processing of COLLISION(Ts,Te) is completed when STATUS(Ts,Te) returns to status A at a certain time, or status B in the whole time interval.

In the flowchart of FIG. 3, judging dmin(te,A,B)<Dcol is to prevent the procedure fro being infinitely executed if there is collision at Ts<=t<=Te. That is, a period including the collision is divided, one of the divided shorter periods includes the collision, and thus the division is infinitely performed. dmin(te,A,B)<Dcol is a condition used to terminate the division. If Dcol is made smaller, accuracy is improved, while the amount of calculation increases. If Dcol is made larger, accuracy is lowered, while the amount of calculation decreases. However, lowering of accuracy means that collision is determined to be likely to occur, even if collision does not occur, and thus no collision is overlooked at all in this case. This differs from the above-mentioned sampling method.

Multiple collision may occur during a continuous motion. In such a case, the collision that occurs first can be detected by always processing two divided time interval parts in order of the first half and then the second half.

Figure 5:
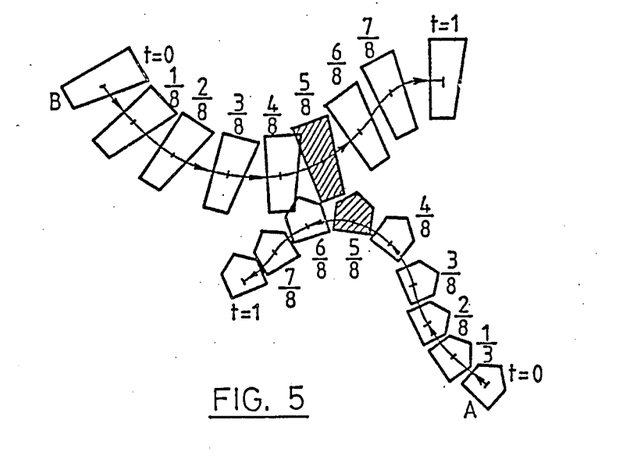
Figure 6A:
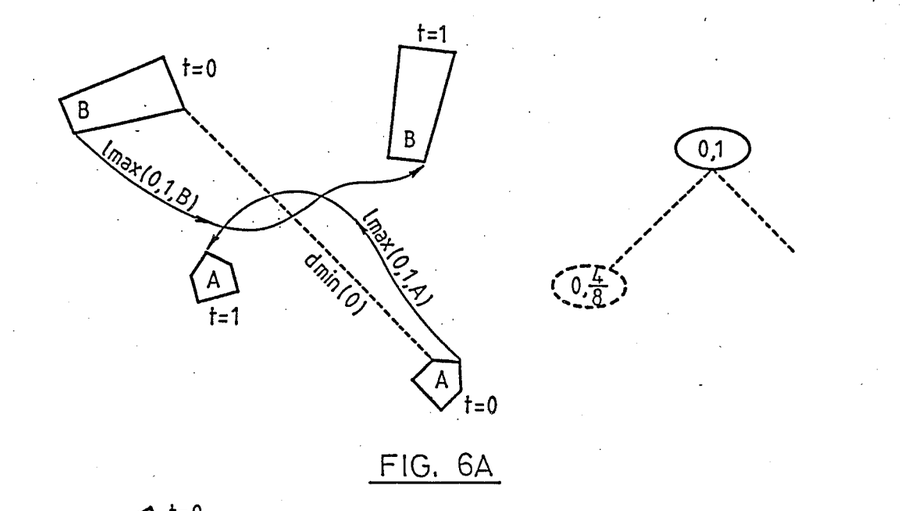

In a case as shown in FIG. 5, the actual processing flow is as follows wherein Ts=0 and Te=1:

$$0 <= t <= 1 \text{ (FIG. 6A)}$$

$$STATUS = C$$

Figure 6B:
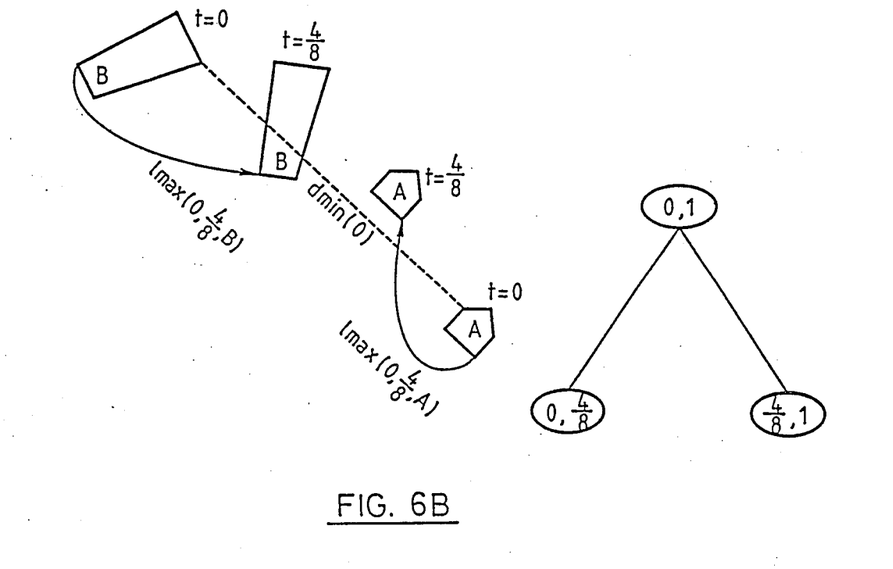

There is no possibility of collision;

Divides into two parts of $0 <= t <= 1/2$ and $1/2 <= t <= 1$ $$0 <= t <= 1/2 \text{ (FIG. 6B)}$$

$$STATUS = B$$

Figure 6C:
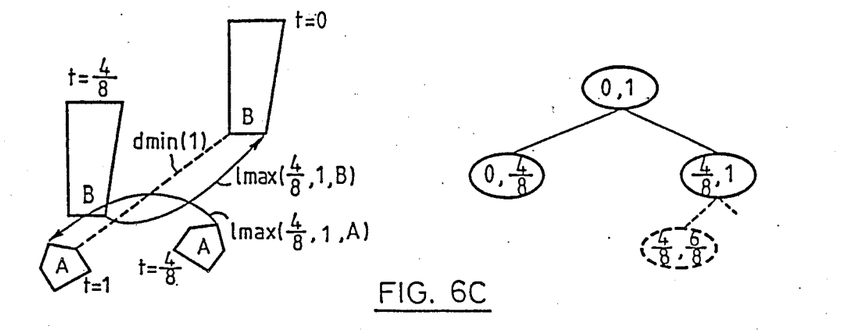

There is no possibility of collision.

$$1/2 <= t <= 1 \text{ (FIG. 6C)}$$

$$STATUS = C$$

Figure 6D:
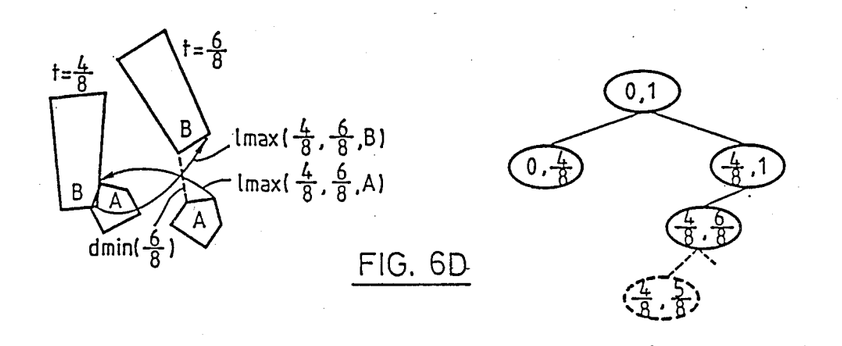

There is a possibility of collision;

Divides into two parts of $1/2 <= t <= 3/4$ and $3/4 <= t <= 1$ $$1/2 <= t <= 3/4 \text{ (FIG. 6D)}$$

$$STATUS = D$$

Figure 6E:
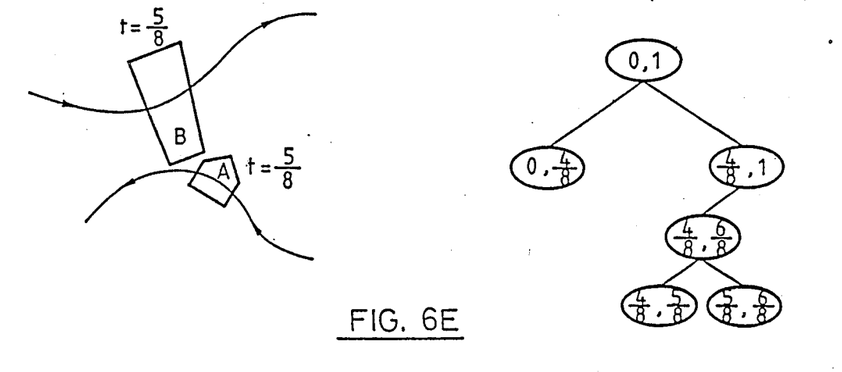

Collision shall occur;

Divides into two parts of $1/2 <= t <= 5/8$ and $5/8 <= t <= 1$ $$1/2 <= t <= 5/8 \text{ (FIG. 6E)}$$

$$STATUS = A$$

Collision id detected at $t = 5/8$ (approximately).

Minimum Distance and Maximum Movement Length

Finding out the minimum distance between objects and the maximum movement length of an object is a major computation in the present invention, and its method is described. It is assumed that the shapes of the objects are represented as polyhedrons.

The minimum distance between two polyhedrons can be obtained by calculating the distance of each pair of edges, and the distance of each pair of a vertex and a face, and then comparing them. Assuming that the numbers of faces, edges and vertices of objects A and B are Fa, Ea, Va, Fb, Ea, and Vb, respectively, the number of combinations are N=FaVb+VaFb+EaEb. Thus, the amount of calculation increases in the order of the square of the number of geometric elements. The increase of the amount of calculation due to the complexity of the shape is a common problem to the calculation using a three-dimensional mode. In this regard, the number of the combinations is reduced by using simpler approximate shapes, or by considering that it is sufficient to find out sets of opposing faces and to make edges and vertices contained within them the subject of calculation, so that the efficiency of the calculation can be improved.

Next, the description is made for a method of calculating the maximum movement length. The one with the largest movement length among points on an object represented by a polyhedron is one of the vertices of the polyhedron. Therefore, it is sufficient to calculate movement lengths only for vertices, and to compare them. If trajectories of vertices are given in functions of time X (t), Y (t) and Z (t), the movement length 1 is expressed by the following equation:

$$1 = \int_{Ts}^{Te} \sqrt{\left(\frac{dx(t)}{dt}\right)^2 + \left(\frac{dy(t)}{dt}\right)^2 + \left(\frac{dz(t)}{dt}\right)^2}\, dt$$

For simple movement as in the following, the indefinite integral has a solution. Translation at a constant speed:

$$X(t) = Axt + Bx,\ Y(t) = Ayt + By,\ Z(t) = Azt + Bz$$

$$1 = \sqrt{Ax^2 + Ay^2 + Az^2}\ (Te - Ts)$$

Rotation at constant angular velocity:

$$X(t)=R\sin(t),\ Y(t)=R\cos(t),\ Z(t)=A$$

$$1=R(Te-Ts)$$

However, a more generic method for representing a trajectory is required to deal with complicated movement of an object such as a robot. One possible method is to approximate the trajectory of a vertex with spline curve as following equations with time t as a parameter:

$$X(t)=Axt+Bxt+Cxt+Dx$$

$$Y(t)=Axt+Bxt+Cyt+Dy$$

$$Z(t)=Axt+Bzt+Czt+Dz$$

In this case, the movement length of the vertex is:

$$1 = \int_{Ts}^{Te} \sqrt{\text{(an equation of } t \text{ of the fourth order)}}\, dt$$

Figure 7:
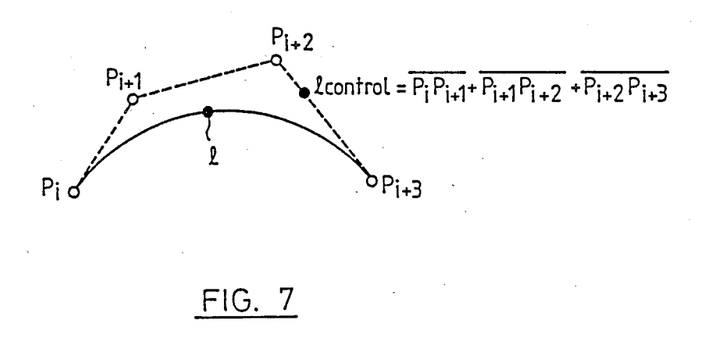
FIG. 7 shows a diagram illustrating a method for calculating movement length in FIG. 3.

Because this indefinite integral cannot be generally solved, a numerical integration is sued. However, if, as shown in FIG. 7, a trajectory is defined as a Bezier curve by control points P, it is possible to use the length of a polygonal line connecting the control points P, lcontrol, instead of the movement 1 in the determining of a condition of collision because the length of the polygonal line lcontrol is always longer than the curve 1. lcontrol can be calculated by an amount of calculation less than that for 1.

Evaluation of the Algorithm

The following three points are important as conditions necessary for an algorithm for detecting collision between moving objects.

There is no overlooking of collision.
Time and state where collision will occur can be detected.
The amount of calculation is small.

An algorithm with a small amount of calculation is required, particularly for an interactive system such as an off-line teaching system of a robot. Now, the amount of calculation in this algorithm is discussed by comparing with the sampling method that has been widely used.

Because much calculation is required for, not limited three-dimensional shape and movement of six degrees of freedom in a space are processed by computer, an algorithm, satisfying the following two points is desirable, to reduce the required calculation to a practical amount.

Amount of calculation corresponds to the "accuracy of solution."
Amount of calculation corresponds to the "possibility of collision."

Here, the "possibility of collision" is intuitively considered as follows:
Low possibility: "Objects that make a relatively small movement with each other at remove positions."
High possibility: "Objects that make a relatively small movement while keeping a close positional relation."

First, the "accuracy of solution" is considered. In the sampling method, the "accuracy of solution" depends on the sampling time interval delta t. Although it is sufficient to make delta t smaller to obtain better accuracy, it increases the amount of the calculation. Although the amount of the calculation may be reduced by making delta t larger in case where so high accuracy is not required, the possibility of overlooking collision arises.

On the other hand, in this algorithm, it is assured that there is no overlooking, regardless of the "accuracy of solution." Because, as described in E2, when objects become close to each other within distance Dcol, it is detected as collision, the value of Dcol itself may be considered as the "accuracy of solution." As in the sampling method, the amount of the calculation increases as Dcol is set to be small, while the amount of the calculation decreases as Dcol is set to be large. However, collision is never overlooked even if Dcol increases and the "accuracy of solution" is made worse.

Figure 8:
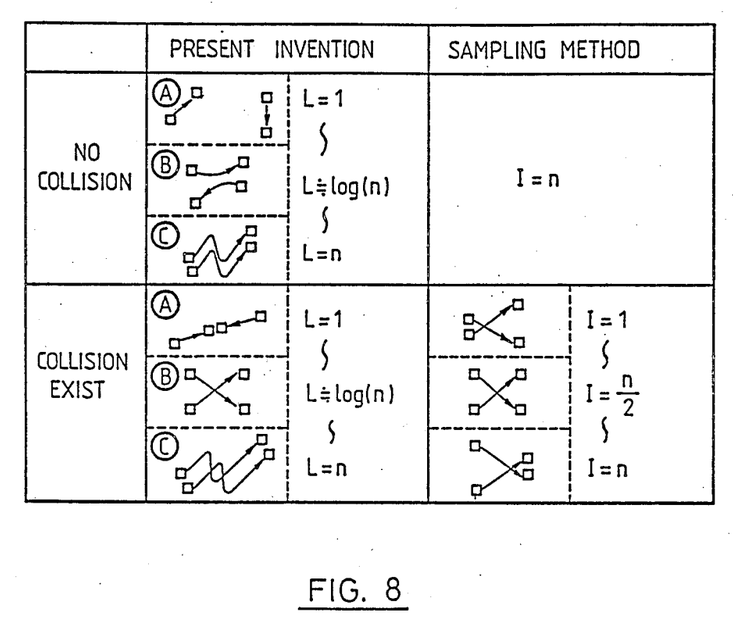
FIG. 8 shows a diagram for comparing the amount of the calculation of the algorithm of FIG. 3 with the sampling method.

Next, consideration is made on the relation between the "possibility of collision" and the amount of the calculation. FIG. 8 shows the results of a comparison between the sampling method and this algorithm. Here, the numbers of repetitions of unit processing, I and L are defined as follows:

I: Number of repetitions of "checking of interference at the steady state between the objects" that is a unit process in the sampling method
L: Number of repetitions of "calculation of the minimum distance between the objects and the maximum movement length" tat is a unit process in the algorithm Assuming that calculation time required for units processes are Ti and Tl, the amount of the calculation as a whole should be estimated as Ti I, and Tl L. However, here, I and L are simply used as measurements of the overall amount of calculation. This is because, although Il is generally larger than Ti, they can be considered the same in regards to their order.

Now, it is assumed that in the sampling method the number of divisions of a trajectory providing sufficient accuracy without overlooking is n. Because the trajectory should be completely checked for an example in which no collision occurs, always I=n regardless of the "possibility of collision." For an example in which collision occurs, the processing is completed at the time of detection, so that I varies in a range of $1 < =I< =n$ and $I=\frac{1}{2}$ as an average. However, in this case, the value of I does not vary in relation to the "possibility of collision."

On the other hand, in the algorithm, the value of L corresponds to the "possibility of collision." For examples with high possibility of collision such as (C) or (C') of FIG. 8, the required amount of calculation becomes $L=n$, the same number of division as in the sampling method in the worst case. However, for examples such as (A) or (A') with low possibility of collision, the processing is completed at $L=1$ in a minimum case. Generally, L in an average case cannot be estimated in a simple manner because it depends on combinations of multiple factors such as the positional relation of trajectories, the shapes of the objects, and the state where collision occurs However, for an example with average difficulty, it is possible to estimate $L=\log(n)$ when it is assumed that the division of a trajectory into two parts occurs at with a probability of $\frac{1}{2}$. As an example which has less possibility of collision, division of a trajectory occurs fewer times, so that L becomes smaller. Thus, this algorithm is superior to the sampling method in that, in the algorithm, details of the processing depends on the "possibility of collision" and no more detailed calculation than that which is necessary is performed.

What is claimed is:

1. An object collision detection apparatus comprising:
    means for obtaining the shortest distance between the surface of one object and the surface of another object at the start time and/or the end time of a given check time interval;
    means for obtaining the longest movement path length of points on each of said one object and said another object during said check time interval;
    determination means for comparing said shortest distance at said start time and/or said end time with the sum of said longest movement path lengths of said one object and said another object, and further for determining whether or not it is ensured that said one object cannot collide with said another object, according to the result of said comparing.

2. An object collision detection apparatus as described in claim 1, wherein:
    said determination means at first determines whether or not it is ensured that said one object cannot collide with said another object, according to said result of said comparing in respect with one of said start time and said end time of said check time interval, and next only if it is not ensured that said one object cannot collide with said another object, determines whether or not it is ensured that said object cannot collide with said another object, according to the comparison between said shortest distance at another of said start time and said end time, and the sum of said longest movement path lengths of said one object and said another object.

3. An object collision detection apparatus as described in claim 1, wherein:
    said determination means determines that is is ensured that said one object cannot collide with said another object, when said shortest distance at said start time and/or end time is larger than said sum of said longest movement path lengths of said one and another object.

4. An object collision detection apparatus comprising:
    means for initially setting a check time interval in which whether or not it is ensured that one object cannot collide with another object is checked;
    means for obtaining the shortest distances between the surface of one object and the surface of another object at the start time and the end time of a current check time interval;
    means for obtaining the longest movement path length of points on each of said one object and said another object during said current check time interval;
    first determination means for comparing said shortest distance at said start time and said end time with the sum of said longest movement path lengths of said one object and said another object, and further for determining whether or not it is ensured that said one object cannot collide with said another object, according to the result of said comparing;
    check time interval renewal means for dividing said current check time interval into a plurality of sub time intervals when said first determination means determines that it is not ensured that said one object cannot collide with said another object, and for setting said sub time intervals in turn as a new check time interval;
    second determination means for checking whether or not said shortest distance(s) at said start time and said end time is less than a predetermined threshold value, when said first determination means determines that it is ensured that said one object cannot collide with said another object during said current check time interval, and for determining that said one object approximately collides with said another object at said start time and/or said end time, when said shortest distance(s) at said start time and/or said end time is less than said threshold value.

5. An object collision detection apparatus as described in claim 4, wherein:
    said first determination means determines that it is ensured that said one object cannot collide with said another object, when said shortest distance at said start time and/or end time is larger than said sum of said longest movement path lengths of said one and another object.

6. An object collision detection apparatus as described in claim 5, wherein:
    said check time interval renewal means sets said divided sub time intervals as a check time interval in order of nearness of said sub time intervals to said start time of said initially set check time interval.

7. An object collision detection apparatus as described in claim 6, wherein:
    said check time interval renewal means checks whether or not said one object overlap with said another object at said end time of said current check time interval, and in case of overlapping, divides said current check time interval into sub time intervals without determination by said first determination means, and sets said sub time intervals as a new check time interval in turn.

8. An object collision detection apparatus as described in claim 4, wherein:
said check time interval renewal means sets said divided sub time intervals as a check time interval in order of nearness of said sub time intervals to said start time of said initially set check time interval.

9. An object collision detection apparatus as described in claim 8, wherein:
said check time interval renewal means checks whether or not said one object overlap with said another object at said end time of said current check time interval, and in case of overlapping, divides said current check time interval into sub time intervals without determination by said first determination means, and sets said sub time intervals as a new check time interval in turn.

10. An object collision detection apparatus as described in claim 4, wherein:
the number of said sub time intervals divided in a time is two.

11. An object collision detection method comprising the steps of:
obtaining the shortest distance between the surface of one object and the surface of another object at the start time and/or the end time of a given check time interval;
obtaining the longest movement path length of points on each of said one object and said another object during said check time interval;
comparing said shortest distance at said start time and/or said end time with the sum of said longest movement path lengths of said one object and said another object, and further for determining whether or not it is ensured that said one object cannot collide with said another object, according to the result of said comparing.

12. An object collision method as described in claim 11, wherein said comparing step further comprises:
determining whether or not it is ensured that said one object cannot collide with said another object, according to said result of said comparing in respect with one of said start time and said end time of said check time interval, and next only if it is not ensured that said one object cannot collide with said another object, determines whether or not it is ensured that said object cannot collide with said another object, according to the comparison between said shortest distance at another of said start time and said end time, and the sum of said longest movement path lengths of said one object and said another object.

13. An object collision detection method as described in claim 11, wherein said comparing step further comprises:
determining that it is ensured that said one object cannot collide with said another object, when said shortest distance at said start time and/or end time is larger than said sum of said longest movement path lengths of said one and another object.

14. An object collision method comprising the steps of:
initially setting a check time interval in which whether or not it is ensured that one object cannot collide with another object is checked;
obtaining the shortest distances between the surface of one object and the surface of another object at the start time and the end time of a current check time interval;
obtaining the longest movement path length of points on each of said one object and said another object during said current check time interval;
comparing said shortest distance at said start time and said end time with the sum of said longest movement path lengths of said one object and said another object, and further for determining whether or not it is ensured that said one object cannot collide with said another object, according to the result of said comparing;
dividing said current check time interval into a plurality of sub time intervals when said comparing step determines that it is not ensured that said one object cannot collide with said another object, and for setting said sub time intervals in turn as a new check time interval;
checking whether or not said shortest distance(s) at said start time and said end time is less than a predetermined threshold value, when said comparing step determines that it is ensured that said one object cannot collide with said another object during said current check time interval, and for determining that said one object approximately collides with said another object at said start time and/or said end time, when said shortest distance(s) at said start time and/or said end time is less than said threshold value.

15. An object collision detection apparatus as described in claim 14, wherein:
said comparing step determines that it is ensured that said one object cannot collide with said another object, when said shortest distance at said start time and/or end time is larger than said sum of said longest movement path lengths of said one and another object.

16. An object collision detection apparatus as described in claim 15 wherein:
setting said divided sub time intervals as a check time interval in order of nearness of said sub time intervals to said start time of said initially set check time interval.

17. An object collision detection method as described in claim 16, wherein:
said dividing step checks whether or not said one object overlap with said another object at said end time of said current check time interval, and in case of overlapping, divides said current check time interval into sub time intervals without determination by said first determination means, and set said sub time intervals as a new check time interval in turn.

18. An object collision detection apparatus as described in claim 14 wherein:
setting said divided sub time intervals as a check time interval in order of nearness of said sub time intervals to said start time of said initially set check time interval.

19. An object collision detection method as described in claim 18, wherein:
said dividing step checks whether or not said one object overlap with said another object at said end time of said current check time interval, and in case of overlapping, divides said current check time interval into sub time intervals without determination by said first determination means, and set said sub time intervals as a new check time interval in turn.

20. An object collision detection method as described in claim 14, wherein:
the number of said sub time intervals divided in a time is two.

* * * * *